United States Patent
Seo et al.

(10) Patent No.: US 9,684,938 B2
(45) Date of Patent: Jun. 20, 2017

(54) METHODS FOR GENERATING ELECTRONIC APPLIANCE IDENTIFIER AND MANAGING INFORMATION BY USING ELECTRONIC APPLIANCE IDENTIFIER

(75) Inventors: Jeong-il Seo, Seoul (KR); Jai-ick Chun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 175 days.

(21) Appl. No.: 13/367,651

(22) Filed: Feb. 7, 2012

(65) Prior Publication Data
US 2012/0239813 A1   Sep. 20, 2012

(30) Foreign Application Priority Data
Mar. 15, 2011   (KR) ........................ 10-2011-0023000

(51) Int. Cl.
  *G06F 15/173* (2006.01)
  *G06Q 50/10* (2012.01)
  *G06Q 10/08* (2012.01)

(52) U.S. Cl.
  CPC ............. *G06Q 50/10* (2013.01); *G06Q 10/08* (2013.01)

(58) Field of Classification Search
  CPC .................................................. G06Q 10/087
  USPC ........................................................ 709/226
  See application file for complete search history.

(56) References Cited

U.S. PATENT DOCUMENTS

| | | | |
|---|---|---|---|
| 2002/0023001 A1* | 2/2002 | McFarlin et al. | 705/14 |
| 2003/0069658 A1* | 4/2003 | Yamazaki | 700/97 |
| 2004/0103037 A1* | 5/2004 | Wetmore et al. | 705/26 |
| 2007/0192681 A1* | 8/2007 | Rashid et al. | 715/513 |
| 2009/0088142 A1* | 4/2009 | Baribault et al. | 455/418 |
| 2009/0138921 A1* | 5/2009 | Miyata | 725/80 |
| 2009/0150356 A1* | 6/2009 | Walker | 707/3 |
| 2009/0287498 A2* | 11/2009 | Choi | 705/1 |
| 2009/0319723 A1* | 12/2009 | Grover et al. | 711/103 |
| 2010/0210292 A1* | 8/2010 | Nooren | 455/466 |
| 2010/0241748 A1* | 9/2010 | Ansari et al. | 709/225 |
| 2010/0321647 A1* | 12/2010 | Schuler et al. | 353/121 |

OTHER PUBLICATIONS iPhone (Transfer Apps, Contacts, Music and Personal Data from an old iPhone to a new iPhone, www.Rickysays.com, Jul. 3, 2009), note that Pictures 1-3 would not capture from webpage and are separately included.*
iPhone 3.1 User's Guide (Apple, 2009).*
Extended European Search Report mailed Jun. 4, 2012 issued in corresponding European Patent Application No. 12154171.8.
"Notice from the European Patent Office dated Oct. 1, 2007 concerning business methods", Official Journal of the European Patent Office, vol. 30, No. 11, Nov. 2007, pp. 592-593.

* cited by examiner

*Primary Examiner* — Vivek Srivastava
*Assistant Examiner* — Nicholas Celani
(74) *Attorney, Agent, or Firm* — Staas & Halsey LLP

(57) ABSTRACT

A method of generating an integrated identifier includes generating a product identifier of an electronic appliance from information indicating a product type of the electronic appliance, generating an individual identifier of the electronic appliance from information regarding an entity to which the electronic appliance belongs, and generating an integrated identifier of the electronic appliance by combining the product identifier and the individual identifier.

16 Claims, 7 Drawing Sheets

METHODS FOR GENERATING ELECTRONIC APPLIANCE IDENTIFIER AND MANAGING INFORMATION BY USING ELECTRONIC APPLIANCE IDENTIFIER

CROSS-REFERENCE TO RELATED APPLICATIONS

This application claims the benefit of Korean Patent Application No. 10-2011-0023000, filed on Mar. 15, 2011, in the Korean Intellectual Property Office, the disclosure of which is incorporated herein in its entirety by reference.

BACKGROUND

1. Field

Aspects relate to a technology for generating an electronic appliance identifier and a technology for managing information using an electronic appliance identifier.

2. Description of the Related Art

With the development of network and communications technologies, electronic appliances can be connected to each other so that information may be exchanged between them. Accordingly, various technologies such as ubiquitous, home network, and smart grid technologies have been created. Thus, a technology for identifying various appliances that together constitute a network has become important.

SUMMARY

Additional aspects and/or advantages will be set forth in part in the description which follows and, in part, will be apparent from the description, or may be learned by practice of the invention.

To solve the above and/or other problems, the aspects provide a method of generating an electronic appliance identifier that guarantees inheritance of information between an old electronic appliance and a new electronic appliance.

Also, aspects provide a method of managing information using an electronic appliance identifier.

Also, aspects provide a computer-readable recording medium having recorded thereon a program for executing the above method on a computer.

According to an aspect, a method of generating an integrated identifier may include generating a product identifier of an electronic appliance from information indicating a product type of the electronic appliance, generating an individual identifier of the electronic appliance from information regarding an entity to which the electronic appliance belongs, and generating an integrated identifier of the electronic appliance by combining the product identifier and the individual identifier.

According to another aspect, a method of providing information to a server that provides a service requiring classification of a plurality of electronic appliances may include receiving a product identifier corresponding to information indicating a product type of any one of the plurality of electronic appliances and information according to use of the electronic appliance, converting the product identifier into an integrated identifier by adding an individual identifier corresponding to information of an entity to which the electronic appliance belongs to the received product identifier, and transmitting the integrated identifier and the received information to the server.

According to another aspect, a method of relaying information acquired from a server that provides a service requiring classification of a plurality of electronic appliances may include receiving from the server the acquired information and an integrated identifier generated by combining a product identifier corresponding to information indicating a product type of the electronic appliance and an individual identifier corresponding to information of an entity to which the electronic appliance belongs, converting the integrated identifier into the product identifier by removing the individual identifier from the received integrated identifier, and transmitting the product identifier and the acquired information to the electronic appliance.

According to another aspect, there may be provided a computer-readable recording medium having recorded thereon a program for executing any one of the above-described methods.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
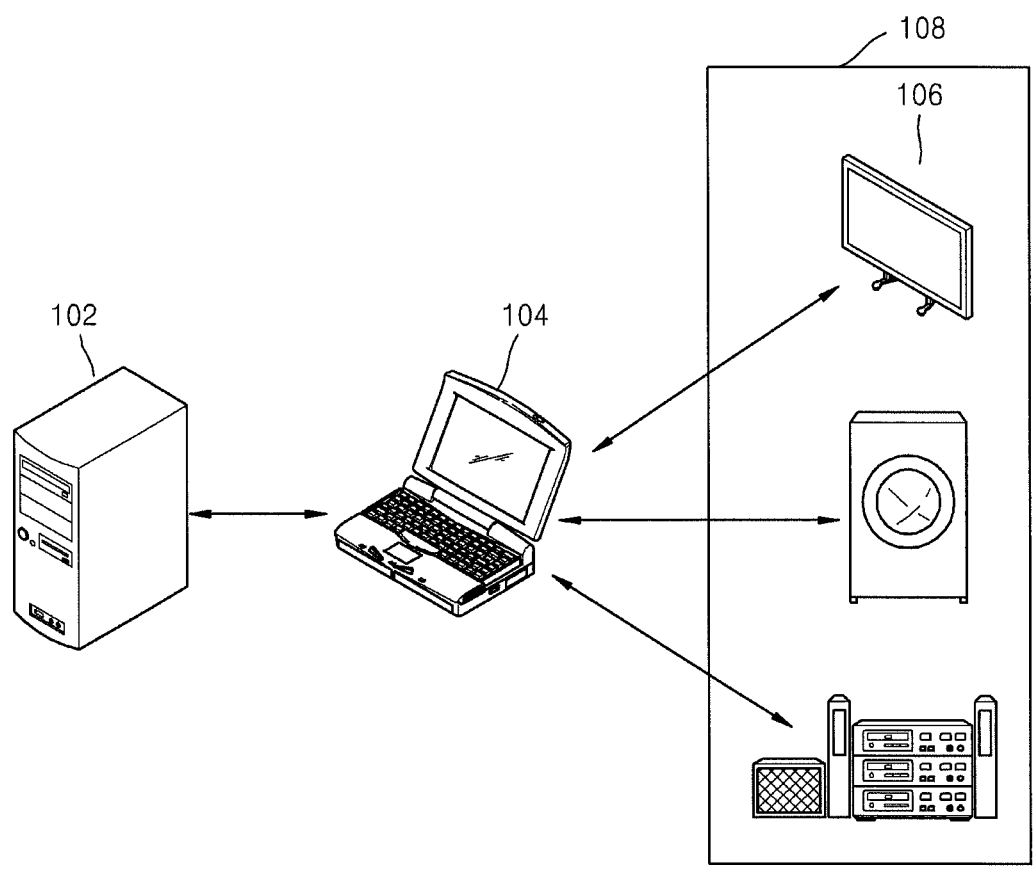
FIG. 1 is a view schematically showing a relationship among a server, an appliance manager, and an electronic appliance, according to an embodiment.

Reference will now be made in detail to the embodiments, examples of which are illustrated in the accompanying drawings, wherein like reference numerals refer to the like elements throughout. The embodiments are described below to explain the present invention by referring to the figures.

The present embodiments are related to a method of generating an electronic appliance identifier and a method of managing information using the electronic appliance identifier. Detailed descriptions on matters that are well known to those skilled in the art to which the present embodiments pertain will be omitted herein.

In order to identify products, properties of a product that are different product-by-product used. An intrinsic value of a product that is used to identify the product is referred to as an identifier. A manufacturing number or serial number of a product has been used as the identifier. In this case, even when a product is changed by the same sort of product, since an identifier is changed, the changed product is recognized as a new product so that information regarding the previous product cannot be used any longer. If the information regarding the previous product is to be used, a specialized program is used to access the identifier of the previous product and identifier information of the previous product is all changed by identifier information of a new product, thereby guaranteeing continuity between the previous product and the new product. As a result, to use the information regarding the previous product for the new product, a problem of maintenance and repair costs occurs. To solve this problem, aspects provide a method of generating a new identifier to identify a product on a network when the product is connected to the network, instead of using an identifier of a product that is fixed when the product is manufactured or released to the market, and a method of managing information regarding the product using the new identifier. The network may be either a wired network or a wireless network. The product may be all electronic appliances that are connectable to the network.

First, an identifier of an electronic appliance may be used to identify a particular electronic appliance among other devices on the same or a different network. Since the identifier may be used to identify each electronic appliance, the identifier of each electronic appliance may be the sole identifier. The identifier of an electronic appliance may be an identifier of all types that are used to identify an electronic appliance. The identifier of an electronic appliance used in an embodiment may include, for example, a product identifier of an electronic appliance and an integrated identifier of an electronic appliance.

The product identifier of an electronic appliance may be an identifier used to identify each electronic appliance by an appliance manager who manages at least one electronic appliance. The product identifier may be generated basically from information indicating a product type of an electronic appliance (hereinafter, referred to as the type information of an electronic appliance). An index and identification data corresponding to particular information may be added to the product identifier. The type information of an electronic appliance may refer, for example, to information used to identify type, format, or classification of an electronic appliance and also signifies the name of an electronic appliance. The type information may be in an extendable form capable of further including manufacturer information of an electronic appliance. The index may be used to identify each electronic appliance among a plurality of electronic appliances having the same type of information. The index may be, for example, a figure such as a number, a character such as an alphabet character, or a symbol and may have a nature of being sequential or having an order according to a certain rule. For example, when an electronic appliance is a television and TV is used as type information of the electronic appliance, if another electronic appliance is also a television, the type information would be TV as well so that there is a need to distinguish between both televisions. In this case, both televisions may be distinguished from each other by adding indexes to both of them so that product identifiers of the electronic appliances may be TV and TV_1. If one more television is added, the product identifiers may be TV, TV_1, and TV_2. Identification data corresponding to particular information is one used to identify one of various information that an electronic appliance has. For example, when an electronic appliance is a television, the identification data may refer to brightness or channel of the television. Thus, identification data of "TV_2_channel" may be used to denote channel of television 2.

The integrated identifier of an electronic appliance may be an identifier used to identify an electronic appliance by not only an appliance manager but also an apparatus for storing information regarding an electronic appliance or software for processing information regarding an electronic appliance, which may be connected to at least one appliance manager. The apparatus for storing information regarding an electronic appliance may be a server and the software for processing information regarding an electronic appliance may be a server program that is executed on the server. The integrated identifier may be an identifier made by combining a product identifier of an electronic appliance and an individual identifier indicating an entity to which the electronic appliance belongs. The integrated identifier may denote which specific electronic appliance belongs to which entity. The individual identifier may be generated from information for identifying an entity (hereinafter, referred to as the individual information). The entity may be, for example, a region to which an electronic appliance belongs, for example, a house or building where the electronic appliance is located, or a person who is an owner of the electronic appliance. When an electric power company desires to know a power consumption amount in a single premises, the electric power company may desire to know the power consumption amount of all electronic appliances located in the single premises. Also, since the electric power company may desire to know to which premises the electronic appliances belong, an integrated identifier that indicates the premises to which electronic appliances belong, that is, an entity, may be needed.

Since an identifier of an old product is an identifier that is fixed when the product is manufactured or released to the market, as described above, the identifier is changed as the product is changed. Accordingly, when the product is changed, it is impossible to access information related to the old product by using the identifier of the old product. However, aspects provide that if a different electronic appliance is of the same type and belongs to the same entity as the old electronic appliance, the different electronic appliance may have the same identifier as that of the old electronic appliance so that information related to the old electronic appliance may be used. The same product identifier as that of the old electronic appliance may be generated according to the information indicating the same product type as that of the old electronic appliance and the same individual identifier as that of the old electronic appliance may be generated by using information of the same entity. Thus, the same integrated identifier as that of the old electronic appliance may be acquired.

FIG. 1 is a view schematically showing a relationship among a server 102, an appliance manager 104, and an electronic appliance 106, according to an embodiment of the present invention. Referring to FIG. 1, a main body that generates or uses an identifier of the electronic appliance 106 may be divided into the server 102, the appliance manager 104, and the electronic appliance 106. The server 102 may denote an apparatus that may store information related to the electronic appliance 106 or software, that is, a server program, that processes the information related to the electronic appliance 106. The appliance manager 104 may be an apparatus or software that manages at least one electronic appliance 106 and interfaces between the server 102 and the electronic appliance 106. The electronic appliance 106 may denote all products that can be connected to a network. The electronic appliance 106 may belong to an entity 108. The server 102, the appliance manager 104, and the electronic appliance 106 may exchange an identifier used for identifying the electronic appliance 106 and information regarding use of the electronic appliance 106. The server 102 and the appliance manager 104 may be separated from each other or integrated in one body.

Figure 2:
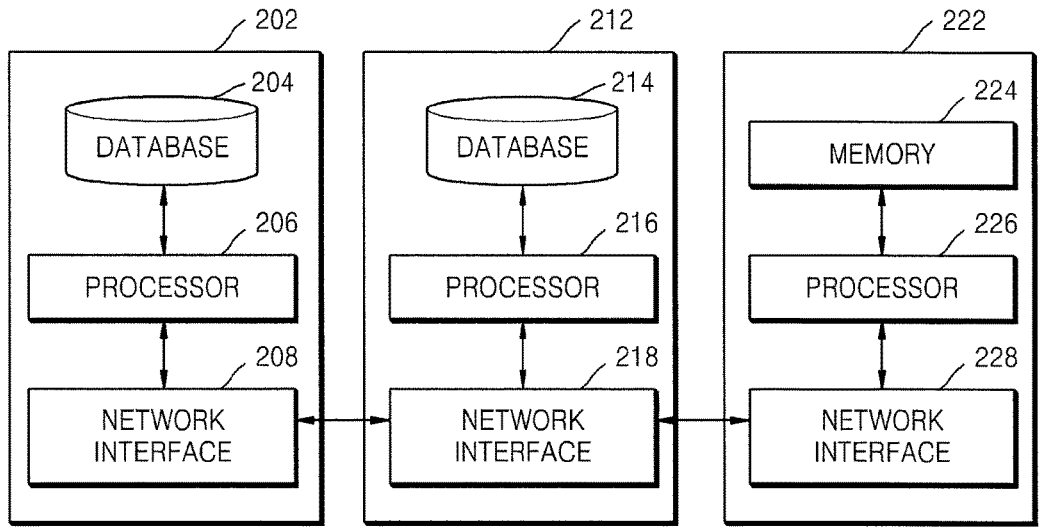
FIG. 2 is a block diagram illustrating an internal structure of the server, the appliance manager, and the electronic appliance, according to an embodiment.

FIG. 2 is a block diagram illustrating an internal structure of a server 202, an appliance manager 212, and an electronic appliance 222, according to an embodiment. Referring to FIG. 2, each of the server 202, the appliance manager 212, and the electronic appliance 222 may work as a main body to generate or use an identifier of the electronic appliance 222. The server 202 may include a network interface 208 for communication with the appliance manager 212, a processor 206 for processing information, and a data storage device or database 204 for storing the identifier of the electronic appliance 222 and information regarding the electronic appliance 222. The appliance manager 212 may include a network interface 218 for communication, a processor 216 for processing information, and a data storage device or database 214 for storing the identifier of the electronic appliance 222, an individual identifier of an entity to which the electronic appliance 222 belongs, the type information of the electronic appliance 222, and information regarding the entity. The electronic appliance 222 may include a network interface 228 for communication with the appliance manager 212, a processor 226 for processing information, and a hard disk drive or a memory 224, as a data storage device, for storing the product identifier or type information of the electronic appliance 222 and information of an entity.

Figure 3:
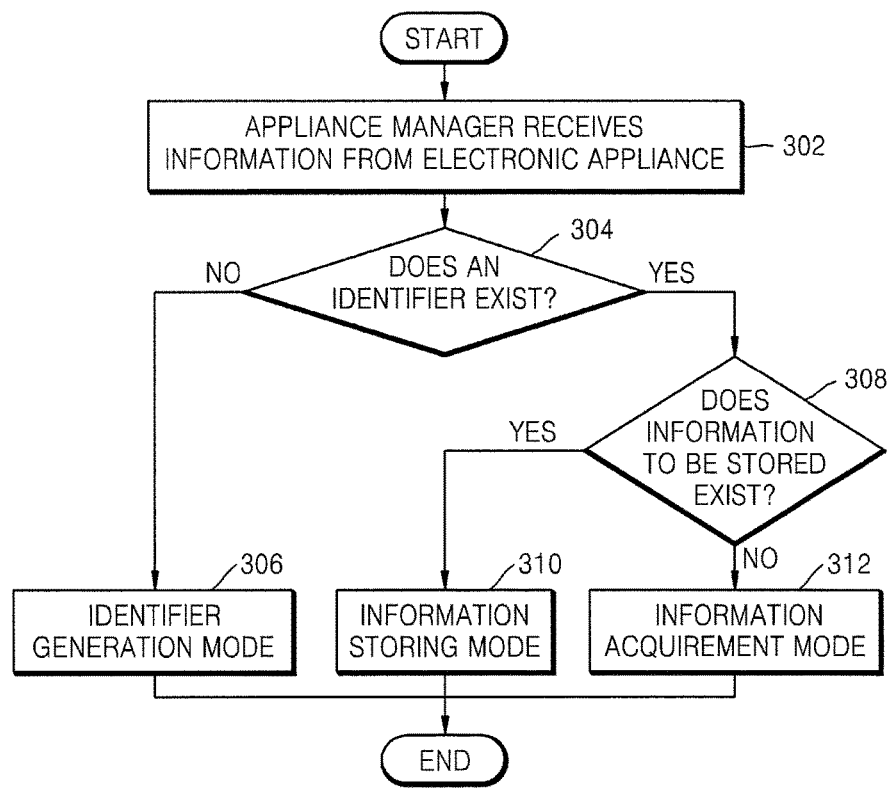
FIG. 3 is a flowchart for explaining a method of generating an electronic appliance identifier and a method of managing information using the electronic appliance identifier, according to an embodiment.

FIG. 3 is a flowchart for explaining a method of generating an identifier of the electronic appliance 222 and a method of managing information using the identifier of the electronic appliance 222, according to an embodiment. According to the type of information that the appliance manager 212 receives, it may be determined whether to generate an identifier of the electronic appliance 222 or to manage information such as providing information to the server 202 for information storage or relaying information for acquiring information of the electronic appliance, the operations of which are be described below.

Referring to FIG. 3, in operation 302, the appliance manager 212 may receive information from at least one electronic appliance 222. If the electronic appliance 222 is first installed and connected to a network connected by the appliance manager 212, the received information may be type information of the electronic appliance 222 and information of an entity to which the electronic appliance 222 belongs. When the electronic appliance 222 is first connected to the network, the electronic appliance 222 may not have its own product identifier. In this case, since the electronic appliance 222 is newly connected to the network, the appliance manager 212 may register on the network the electronic appliance 222 and an entity to which the electronic appliance 222 belongs. The type information of the electronic appliance 222 and the information of an entity may be used. If the electronic appliance 222 is the old electronic appliance which has already connected to the network, since the appliance manager 212 may transmit a product identifier at the first connection to the network, information may be transmitted to the server 202 or received from the server 202 using the product identifier. Thus, the information received from the electronic appliance 222 may be, for example, one of a product identifier of the electronic appliance 222, an identifier including identification data about particular information in addition to the product identifier of the electronic appliance 222, and information requiring storage with each of the above two identifiers.

In operation 304, it may be checked whether a product identifier of the electronic appliance 222 is received. Hence, it may be determined whether the electronic appliance 222 is first connected to the network or whether the electronic appliance 222 is the old electronic appliance which has already connected to the network. Since the product identifier of the electronic appliance 222 may be generated by the appliance manager 212 and transmitted to the electronic appliance 222, if the electronic appliance 222 is first connected to the appliance manager 212 through the network, the electronic appliance 222 may have no identifier.

In operation 306, an operation of generating an identifier of the electronic appliance 222 that is newly installed may be performed, as is described in detail below with reference to FIG. 4.

In operation 308, it may be determined whether a product identifier is transmitted together with information to be stored in the server 202 from the electronic appliance 222 has already connected to the network and has the product identifier. If the information to be stored is transmitted together, the information may be provided to the server 202 to be stored therein. Otherwise, information regarding the electronic appliance 222 may be acquired from the server 202 and relayed to the electronic appliance 222 so that the electronic appliance 222 may use the acquired information.

In operation 310, when information including information to be stored other than the identifier of the electronic appliance 222 is received, an information providing process for storing information may be performed. A general process in relation thereto is described below with reference to FIG. 6.

In operation 312, when information to be stored other than the identifier of the electronic appliance 222 is not included, information regarding the electronic appliance 222 corresponding to the identifier may be acquired from the server 202 using the identifier of the electronic appliance 222 and the information may be relayed to the electronic appliance 222. Accordingly, the process in which the electronic appliance 222 uses the acquired information may be performed, as is described below with reference to FIGS. 7A and 7B.

Figure 4:
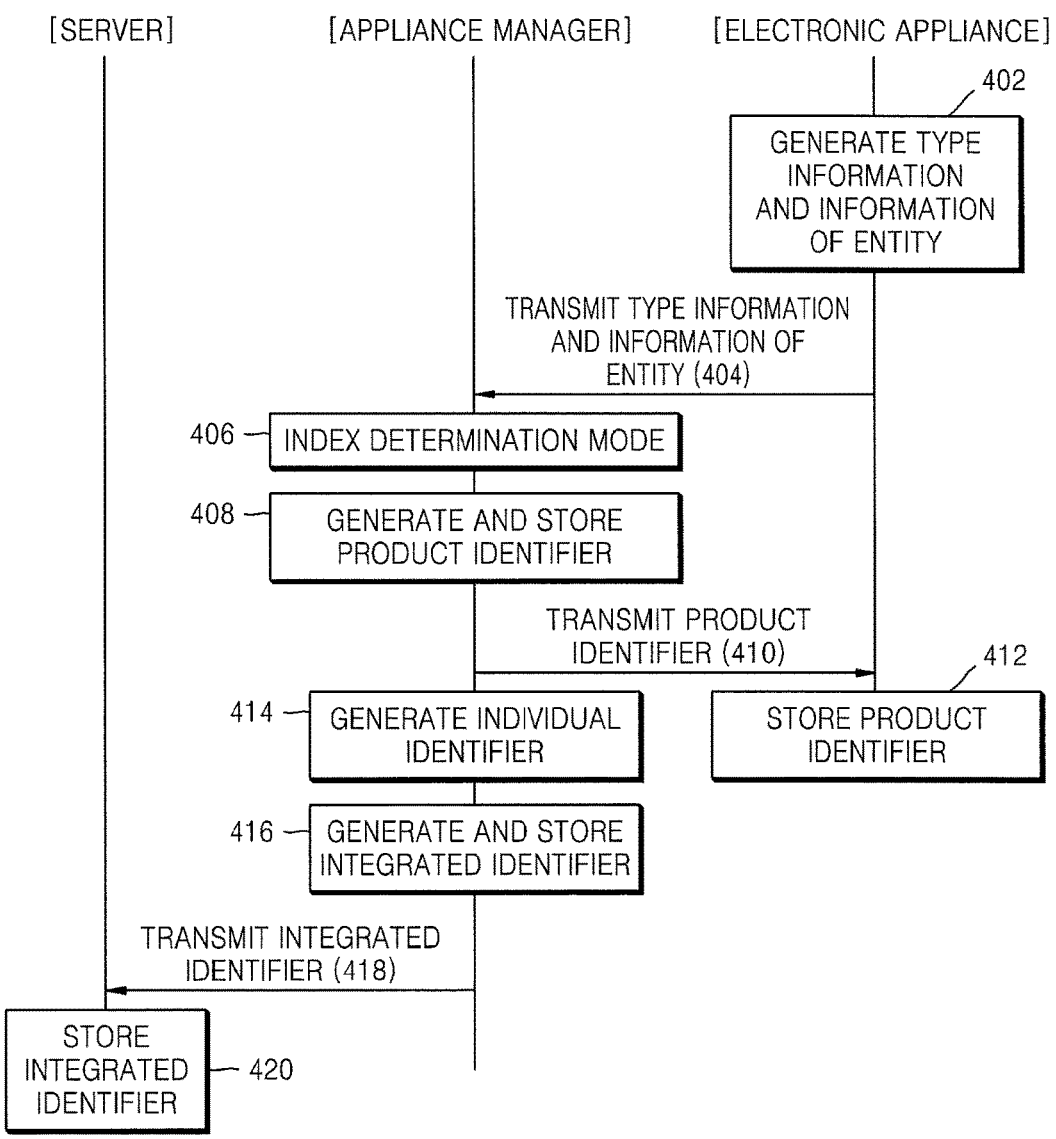
FIG. 4 is a block diagram illustrating a relationship and a process among the server, the appliance manager, and the electronic appliance when an electronic appliance identifier is generated, according to an embodiment.

FIG. 4 is a block diagram illustrating a relationship and a process among the server 202, the appliance manager 212, and the electronic appliance 222 when the identifier of the electronic appliance 222 is generated, according to an embodiment. In detail, a process of generating a product identifier and an integrated identifier of the electronic appliance 222 when the electronic appliance 222 is first installed and connected to a network where the appliance manager 212 is located will be described. When an initialization operation of the electronic appliance 222 being installed at and connected to the network is performed, a process of generating an identifier of the electronic appliance 222 may be performed.

In operation 402, type information of the electronic appliance 222 and information of an entity may be prepared. The information may be stored in the memory 224 of the electronic appliance 222 or input by a user. The information of an entity may be received from apparatuses having information of an entity that is connected to the appliance manager 212 or directly input by the user to the appliance manager 212.

In operation 404, the electronic appliance 222 may transmit the type information of the electronic appliance 222 and the information of an entity to the appliance manager 212. In this case, the appliance manager 212 may perform the above-described operations 302 and 304 of FIG. 3, and may determine whether it is in an identifier generation mode, thereby performing the following operations.

In operation 406, the appliance manager 212 may perform an index determination mode using the type information of the two received pieces of information. As described above, the index may be used to identify the electronic appliance 222 when the type information of pieces of electronic appliances 222 are the same. The index may be determined in a variety of methods. Each of product identifiers of all electronic appliances may have an index or an index may be added to an identifier corresponding to the type information if an electronic appliance having the same type information such as type information of an existing electronic appliance in an entity is included in the entity. The case of adding an index to an identifier corresponding to the type information if an electronic appliance having the same type information such as type information of an existing electronic appliance in an entity is included in the entity will be described below. In this case, when pieces of product type information of all electronic appliances that belong to one entity are different from each other, an index may not be added to all product identifiers. That is, the determination of an index may not be performed when the same type information is not received. When the same type information is received, an index may be determined. How the index determination mode is performed will be described as follows with reference to FIG. 5.

Figure 5:
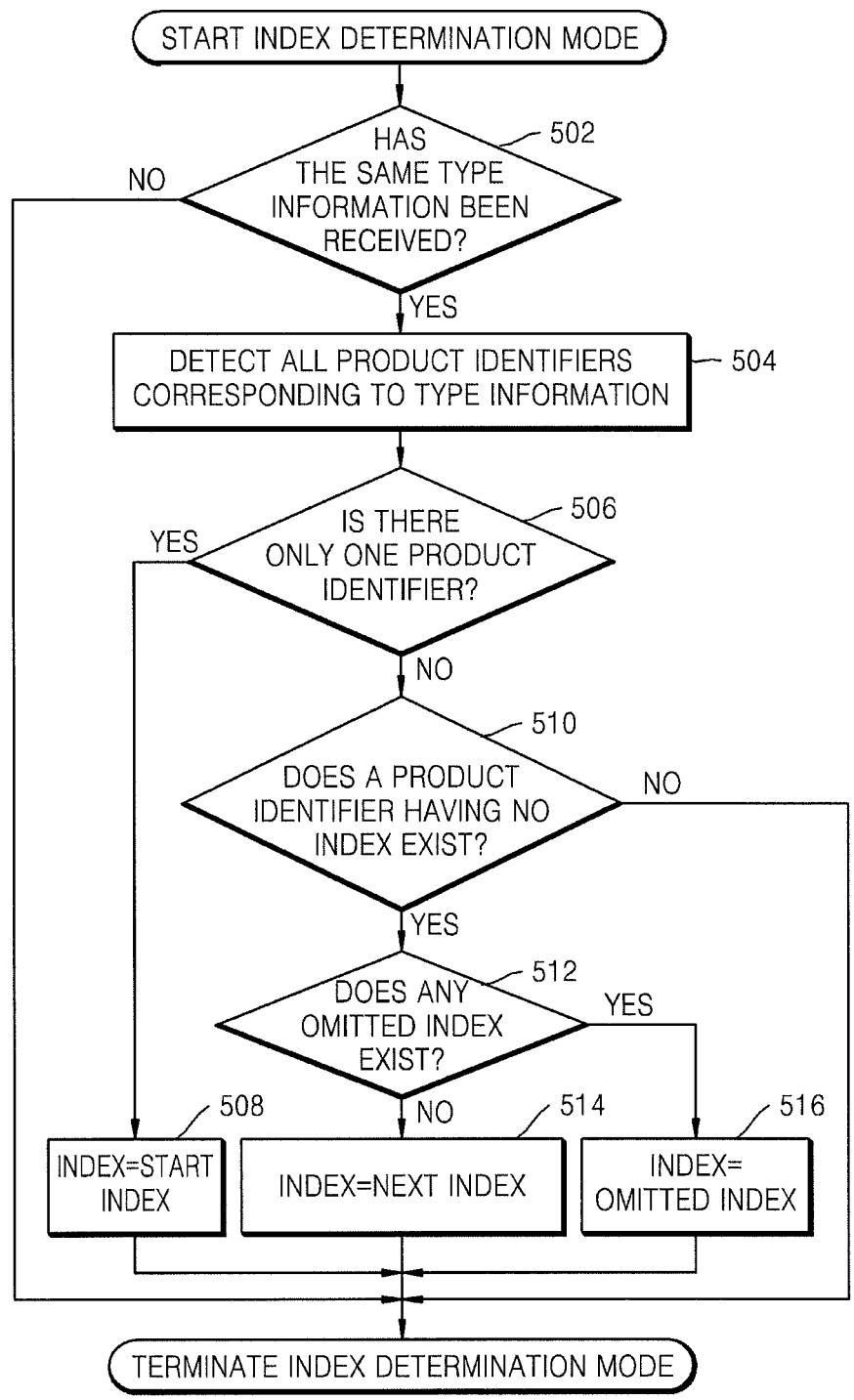
FIG. 5 is a flowchart for explaining in detail an index determination mode corresponding to operation 406 of FIG. 4.

FIG. 5 is a flowchart for explaining in detail the index determination mode corresponding to operation 406 of FIG. 4. In operation 502, the appliance manager 212 may check whether the same type information as the received type information of the electronic appliance 222 has been received. Such a check is possible through the product identifier of the electronic appliance 222 that is stored in the database 214. Since the product identifier of the electronic appliance 222 is generated from the type information of the electronic appliance 222, if there is a product identifier including the identifier corresponding to the received type information, it may mean that the electronic appliance 222 having the same product type information exists on the network, and thus, an index may be needed. Thus, correlation between the type information and the identifier and the product identifier with respect to the electronic appliance 222 connected to the network may need to be stored in the database 214.

The appliance manager 212 may check whether the product identifier including an identifier corresponding to the received type information of the electronic appliance 222 is stored in the database 214. If the product identifier including an identifier corresponding to the received type information does not exist, which means that the electronic appliance 222 having the same product type does not exist on the network, there may be no need to add an index to an identifier corresponding to the type information so that the index determination mode may be terminated.

In operation 504, if there is a product identifier including an identifier corresponding to the received type information of the electronic appliance 222, all product identifiers including to the identifier corresponding to the received type information may be detected from the database 214.

In operation 506, it may be determined whether the number of product identifiers is one. In other words, it may be determined whether only a product identifier having no index exists. If the number of product identifiers is one, the process may go to operation 508. If the number is two or more, the process may go to operation 510.

In the operation 508, when the product identifier is one, only one electronic appliance having the same type information exists in an entity. Since the product identifier is not indexed, an index value to be generated and added to the product identifier may be determined to be a start index value.

In operations 510 and 512, when any one of the electronic appliances belonging to an entity is changed to be one not belonging to the entity, an index of an electronic appliance that replaces an old electronic appliance changed to be one not belonging to the entity may be determined to be an index of the old electronic appliance changed to be one not belonging to the entity.

In operation 510, it may be determined whether a product identifier having no index exists. This is to determine whether a product identifier having no index among two or more product identifiers may be deleted from the database 214. If a product identifier having no index does not exist, which means a product to be replaced is a product having no index, the index determination mode may be terminated in order not to add an index to an identifier corresponding to the type information. Otherwise, if a product identifier having no index exists and one or more product identifiers additionally exist, operation 512 may be performed.

In operation 512, it may be determined whether there are any indexes omitted from indexes added to product identifiers. If an omitted index exists, a product identifier and an integrated identifier including the omitted index may be deleted from the database 214, which means that an electronic appliance corresponding to the product identifier including the omitted index does not belong to an entity.

In operation 514, otherwise, if an omitted index does not exist, when indexes having an order according to a predetermined rule are arranged according to the order, an index corresponding to the next one of the final index may be determined to be an index to be added to the product identifier. This is a case in which an electronic appliance may be added to, not replaced from an entity.

In operation 516, if an omitted index exists, the omitted index may be determined to be an index to be added to a product identifier to be generated.

In operation 408, the appliance manager 212 may generate a product identifier of the electronic appliance 222 from the type information of the electronic appliance 222 received from the electronic appliance 222. Since the correlation between the type information and the identifier may exist in the database 214, the product identifier may be generated using the correlation. If there is an index determined in operation 406, a product identifier of the electronic appliance 222 may be generated by combining the index and the identifier corresponding to the type information. The generated product identifier of the electronic appliance 222 may be stored in the database 214 of the appliance manager 212.

In operation 410, the appliance manager 212 may transmit the generated product identifier of the electronic appliance 222 to the corresponding electronic appliance 222.

In operation 412, the electronic appliance 222 may store the received product identifier in the memory 224. Accordingly, the electronic appliance 222 may invoke the received product identifier of the electronic appliance 222 from the memory 224 for use, if necessary.

In operation 414, the appliance manager 212 may generate an individual identifier using information of an entity. A process of generating an individual identifier may be separate from the process of generating a product identifier and may be performed simultaneously with the above-described operations 406 or 408. An identifier with respect to a territory to which the electronic appliance 222 belongs may be generated with information regarding an entity, that is, an area or a person to which the electronic appliance 222 belongs. An individual identifier may be generated using information regarding an area to which the electronic appliance 222 belongs, for example, intrinsic information such as an address of a house or an address of a gateway of a network, where the electronic appliance 222 is installed or located. An individual identifier may be generated using information regarding a person to which the electronic appliance 222 belongs, for example, an ID number or email address of a person. Since information of an entity is changeable, an individual identifier may be changed. For example, when a user of the electronic appliance 222 is set to be an entity to which the electronic appliance 222 belongs, information that can indicate a user of the electronic appliance 222 may be plural. An ID number or an email address may be used as information to distinguish users, for example, for a case of an email, one person may have a plurality of email addresses. Also, a single electronic appliance 222 may simultaneously belong to a plurality of entities. In operation 404, the information of an entity may be transmitted together with type information or directly input to the appliance manager 212 by a user, or the appliance manager 212 may receive the information of an entity from other apparatuses having the information of an entity that is connected to the appliance manager 212. If necessary, an approval process for checking the information of an entity may be needed. When an individual identifier is generated according to the information of an entity, the individual identifier may be stored in the database 214 of the appliance manager 212.

In operation 416, the appliance manager 212 may generate an integrated identifier by combining a product identifier and an individual identifier. As described above, the integrated identifier may indicate which entity the electronic appliance 222 belongs to. For a case of the server 202, it may be determined by checking the integrated identifier which entity the electronic appliance 222 belongs to or what the electronic appliance 222 is. The generated integrated identifier may be stored in the database 214 of the appliance manager 212.

In operation 418, the appliance manager 212 may transmit the generated integrated identifier to the server 202. The transmission of the integrated identifier to the server 202 may indicate that the electronic appliance 222 is connected to the network.

In operation 420, the server 202 may store the received integrated identifier in the database 204. Accordingly, when the integrated identifier of the electronic appliance 222 is transmitted to the server 202, the server 202 may identify the electronic appliance 222 and may store information regarding the electronic appliance 222 in the database 204. That is, in the process of transmitting or receiving information regarding the electronic appliance 222 to or from the appliance manager 212, the identification of the electronic appliance 222 may be performed by comparing at least one integrated identifier of the electronic appliance 222 stored in the database 204 and the integrated identifier of the electronic appliance 222 received from the appliance manager 212.

Figure 6:
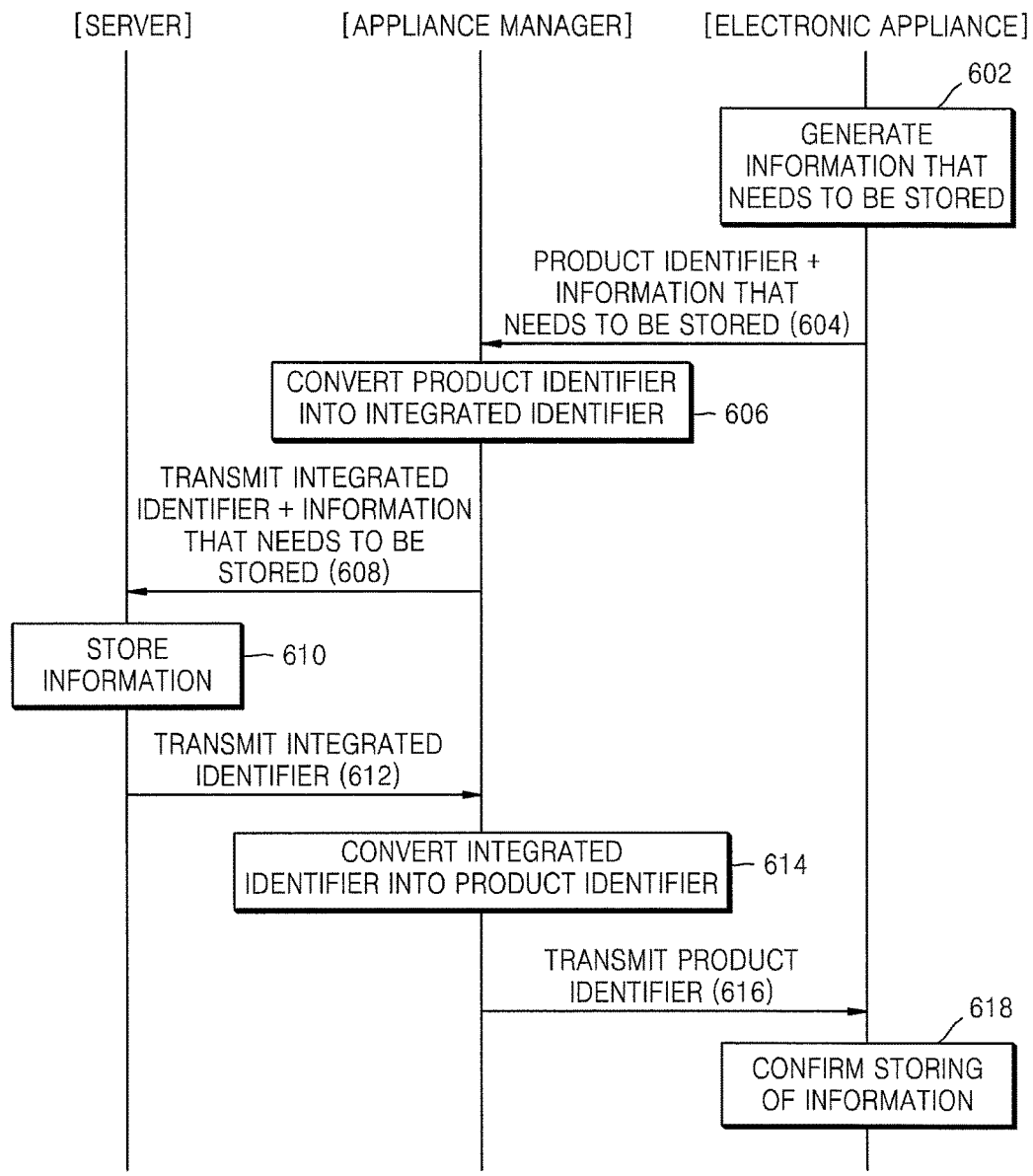
FIG. 6 is a block diagram illustrating a relationship and a process among the server, the appliance manager, and the electronic appliance when information according to use of an electronic appliance is provided to a server and stored therein, according to an embodiment.

FIG. 6 is a block diagram illustrating a relationship and a process among the server 202, the appliance manager 212, and the electronic appliance 222 when information according to use of the electronic appliance 222 is provided to the server 202 and stored therein, according to an embodiment. In detail, FIG. 6 illustrates a process of storing information according to use of the electronic appliance 222 connected to a network, in the server 202. In FIG. 6, storing of information may include all of addition, change, or deletion of information. The change of information may be performed in a way of storing content to be replaced in a content to change. The deletion of information may be performed in a way of storing an NULL value denoting that no information exists in a content to be deleted.

In operation 602, information that is to be stored in the server 202 according to use of the electronic appliance 222 may be generated. The information that is to be stored in the server 202 may be, for example, setting information of the electronic appliance 222, information regarding use of the electronic appliance 222, or information for use of the electronic appliance 222. The setting information of the electronic appliance 222 may refer to information set by a user in use of the electronic appliance 222, such as, for example, equalizer setting information of an MPEG audio layer-3 (MP3) or temperature setting information of a refrigerator. When a setting process or setting itself of the electronic appliance 222 is complicated, if operations for the setting of the electronic appliance 222 are repeated whenever the electronic appliance 222 is replaced, a time or cost problem may arise and it is difficult for a user to remember each setting information or process. Accordingly, by storing the setting information of the electronic appliance 222 in the server 202, when the electronic appliance 222 is replaced, the setting information of the electronic appliance 222 stored in the server 202 may be transmitted to the electronic appliance 222 so that the above problem may be solved. The information related to use of the electronic appliance 222 may refer to information generated according to the user of the electronic appliance 222, for example, a power consumption amount or use time of the electronic appliance 222. When the server 202 is a server of a power supply company, the server 202 may need to know, for example, the power consumption amount of the electronic appliance 222 or an entity to which the electronic appliance 222 belongs to. The information for use of the electronic appliance 222 may refer to information used when using the electronic appliance 222 and may be, for example, a telephone book or an address book when the electronic appliance 222 is a mobile phone.

In operation 604, the electronic appliance 222 may transmit a product identifier of the electronic appliance 222 and the information that needs to be stored in the server 202 to the appliance manager 212. In this case, the appliance manager 212 may perform the above-described operation 302 of FIG. 3 and may determine whether it is an information storing mode from the type of the information transmitted through operations 304 and 308 of FIG. 3.

In operation 606, the received product identifier of the appliance manager 212 may be converted into an integrated identifier of the electronic appliance 222 in a form that the server 202 can identify the electronic appliance 222. The conversion may be possible in a way of extracting an integrated identifier corresponding to the received product identifier among integrated identifiers of the electronic appliances stored in the database 214 of the appliance manager 212.

In operation 608, the appliance manager 212 may transmit the integrated identifier of the electronic appliance 222 and the information that needs to be stored in the server 202, to the server 202.

In operation 610, the server 202 may determine to which electronic appliance 222 the received information is related to by using the received integrated identifier of the electronic appliance 222. When the electronic appliance 222 is first connected to the network, a product identifier and an integrated identifier may be generated and the integrated identifier may be transmitted to the server 202 and stored in the database 204. Accordingly, by comparing the received integrated identifier with one stored in the database 204, it can be seen that the received information may be information regarding which electronic appliance 222. The information, which is received from the appliance manager 212 and needs to be stored, may be stored in the database 204 of the server 202.

In operation 612, the server 202 may return the integrated identifier of the electronic appliance 222 to the appliance manager 212. Although the storing of information may be completed in operation 610, since a user of the electronic appliance 222 cannot know whether the transmitted information is stored or not, the present process may be needed to notify that the storing is completed.

In operation 614, the appliance manager 212 may convert the integrated identifier of the electronic appliance 222 into a product identifier. This may be done by reversely performing the operation of the above-described operation 606. That is, the product identifier of the electronic appliance 222 may be obtained by extracting a product identifier corresponding to the integrated identifier from the database 214 using the integrated identifier of the electronic appliance 222.

In operation 616, the appliance manager 212 may return the product identifier of the electronic appliance 222 to the electronic appliance 222.

In operation 618, as the electronic appliance 222 receives the same product identifier as the product identifier stored in the memory 224 from the appliance manager 212, it can be confirmed that the storing of the information that needs to be stored in the server 202 is successfully completed.

In the above-described operations 604-618, the product identifier and the integrated identifier of the electronic appliance 222 may be an identifier in the form of further including identification data corresponding to information set to the electronic appliance 222 by a user of the electronic appliance 222. This is to further separately identify particular information. That is, when the identifier of the electronic appliance 222 is in the form of further including identification data corresponding to particular information, the identifier of the electronic appliance 222 may be distinguished from the form to be specific information set to the electronic appliance 222 by a user of the electronic appliance 222.

Figure 7A:
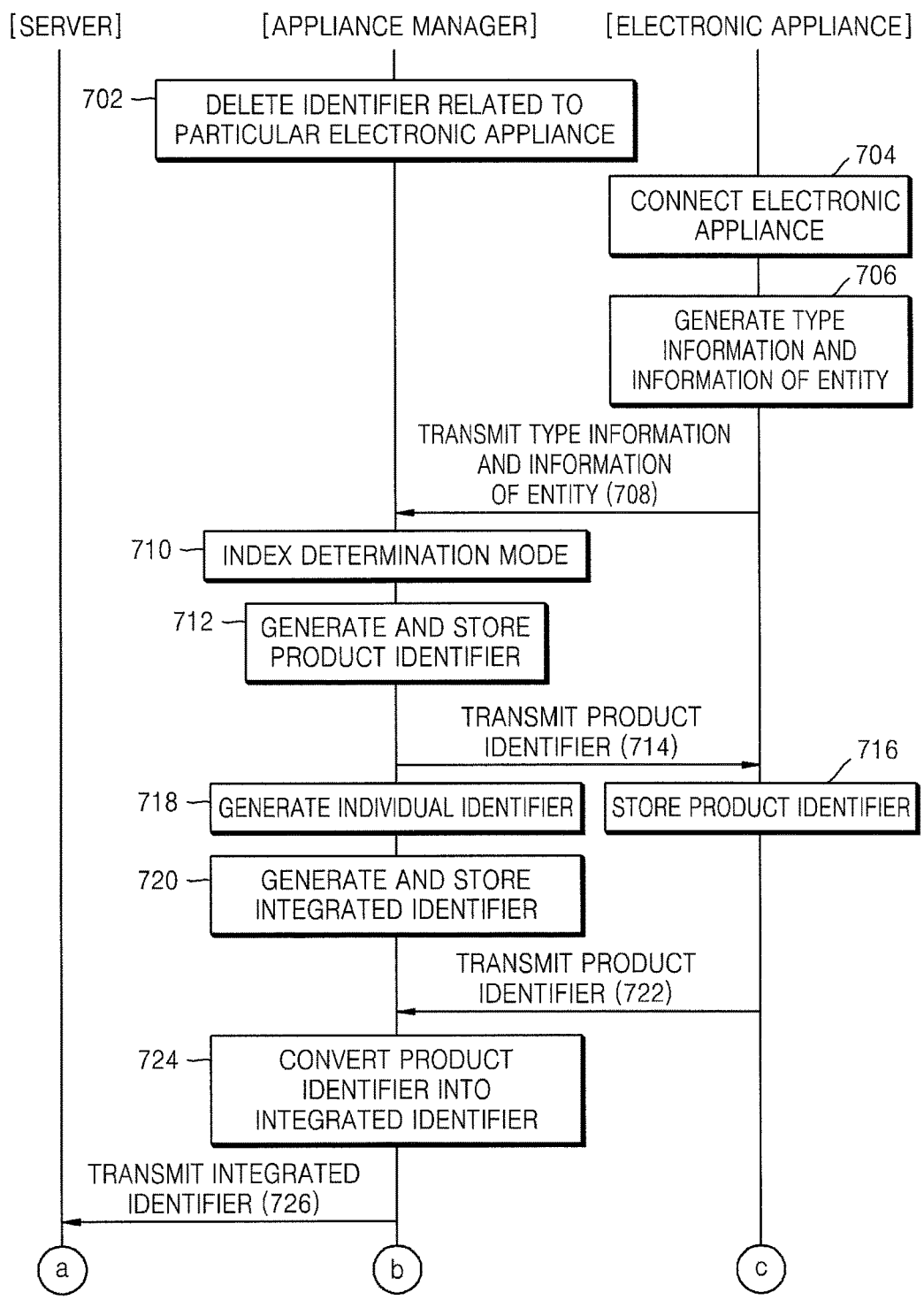
FIGS. 7A and 7B are block diagrams illustrating a relationship and a process among the server, the appliance manager, and the electronic appliance when information is acquired from the server and relayed to the electronic appliance, according to an embodiment.
Figure 7B:
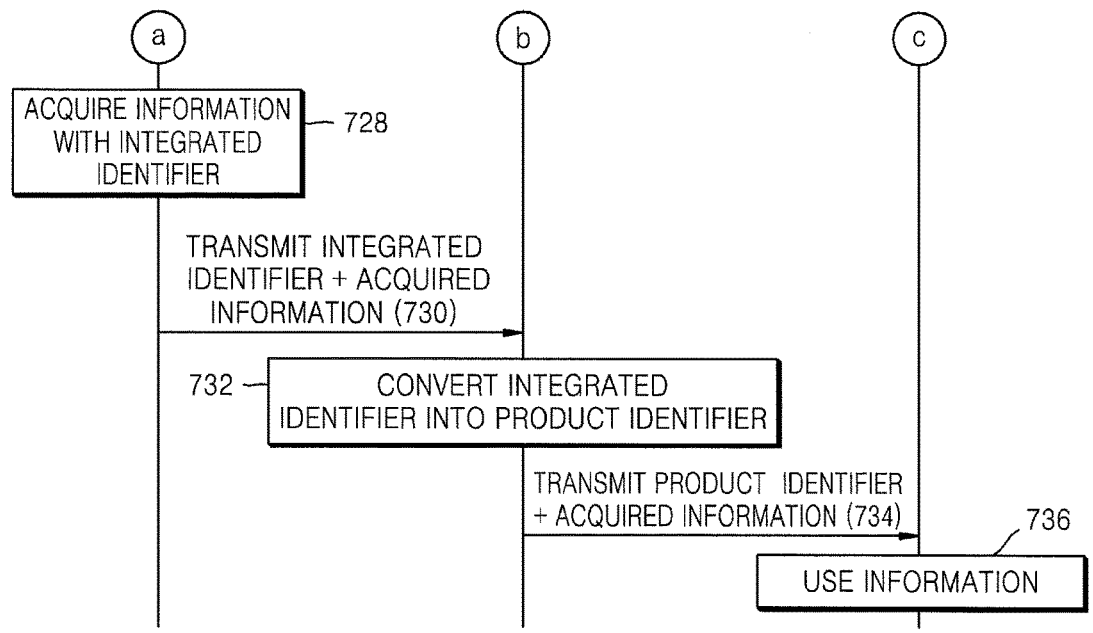

FIGS. 7A and 7B are block diagrams illustrating a relationship and a process among the server 202, the appliance manager 212, and the electronic appliance 222 when information is acquired from the server 202 and relayed to the electronic appliance 222, according to an embodiment. In detail, FIGS. 7A and 7B illustrate a general process in which a new electronic appliance 222 may acquire information regarding the old electronic appliance from the server 202 for use when the old electronic appliance is replaced by the new electronic appliance 222 of the same type belonging to the same entity.

In operation 702, the appliance manager 212 may delete an identifier related to the old electronic appliance to be replaced that is stored in the database 214, that is, the product identifier and the integrated identifier of the old electronic appliance, from the database 214. This is possible as a user determines the old electronic appliance to be removed from the entity and controls the appliance manager 212.

In operation 704, when an initialization operation of replacing with a new electronic appliance 222 and connecting to the network is performed, a process of the new electronic appliance 222 acquiring information of the old electronic appliance for use may be started. Accordingly, the inheritance of information, that is, continuity between the electronic appliances, may be accomplished.

In operation 706, since the new electronic appliance 222 may be first connected to the network where the appliance manager 212 is located, type information of the new electronic appliance 222 may be generated to receive a product identifier of the new electronic appliance 222. If there is no type information in the memory 224, type information that is received from the user may be stored in the memory 224. Also, information of an entity used to generate an individual identifier may be received from the memory 224 or input by the user.

In operation 708, the new electronic appliance 222 may transmit the type information of the new electronic appliance 222 and the information of an entity to the appliance manager 212. The transmitted type information of the new electronic appliance 222 and the information of an entity may match a type information of the old electronic appliance and information of an entity to which the old electronic appliance belonged.

In operation 710, the appliance manager 212 may perform an index determination mode. As described above, referring to FIG. 5, if the old electronic appliance has no index, the new electronic appliance 222 may have no index as well so that the index determination mode may be instantly terminated. If the old electronic appliance has an index, the index of the new electronic appliance 222 may be determined to be the same as that of the old electronic appliance.

In operation 712, the appliance manager 212 may generate a product identifier of the new appliance manager 212 as a product identifier of the same form as the product identifier of the old appliance manager 212 and may store the product identifier of the appliance manager 212 in the database 214 of the appliance manager 212.

In operation 714, the appliance manager 212 may transmit the generated product identifier of the new electronic appliance 222 to the new electronic appliance 222.

In operation 716, the new electronic appliance 222 may store the received product identifier of the new electronic appliance 222 in the memory 224. Accordingly, the new electronic appliance 222 may have the same product identifier as that of the old electronic appliance.

In operation 718, the appliance manager 212 may generate an individual identifier using the received information of an entity. In this case, the information of an entity may be identical to that between the new electronic appliance 222 and the old electronic appliance. Since the information of an entity may be identical to that between the new electronic appliance 222 and the old electronic appliance, the same individual identifier as that of the old electronic appliance may be generated.

In operation 720, the appliance manager 212 may generate an integrated identifier of the new electronic appliance 222. Since the product identifier and the individual identifier of the new electronic appliance 222 may be the same as those of the old electronic appliance, an integrated identifier of the new electronic appliance 222 may be the same as that of the old electronic appliance. As a result, the information of the old electronic appliance stored in the server 202 may be accessed with the integrated identifier of the new electronic appliance 222 that may be the same as that of the old electronic appliance. A method of acquiring and using information of the old electronic appliance by the new electronic appliance 222 will be described below.

In operation 722, the new electronic appliance 222 may check and transmit the product identifier stored in the memory 224 to the appliance manager 212.

In operation 724, the appliance manager 212 may convert the received product identifier into an integrated identifier. The conversion may be done by a method of extracting the integrated identifier corresponding to the received product identifier of the new electronic appliance 222 stored in the database 214 of the appliance manager 212 by using the received product identifier.

In operation 726, the appliance manager 212 may transmit the integrated identifier of the new electronic appliance 222 to the server 202.

In operation 728, the server 202 may compare the received integrated identifier of the new electronic appliance 222 with the integrated identifiers of the electronic appliances stored in the database 204 to determine which electronic appliance is requested for the information, and may extract necessary information from the database 204 of the server 202. Accordingly, the information requested by the new electronic appliance 222 may be acquired.

In operation 730, the server 202 may transmit the integrated identifier of the new electronic appliance 222 and extracted information to the appliance manager 212.

In operation 732, the appliance manager 212 may convert the integrated identifier of the new electronic appliance 222 into a product identifier. This may be done by reversely performing the operation of the above-described operation 724, that is, in a method of extracting a product identifier corresponding to the received integrated identifier from the database 214 by using the received integrated identifier of the electronic appliance 222.

In operation 734, the appliance manager 212 may transmit the product identifier of the new electronic appliance 222 and the information received from the server 202 to the electronic appliance 222.

In operation 736, the new electronic appliance 222 may receive and use the product identifier of the new electronic appliance 222 and the information of the old electronic appliance replaced. The information of the old electronic appliance may be setting information, information regarding use of the old electronic appliance, or information for use of the old electronic appliance. For example, when a user performed a particular setting on the old electronic appliance, the setting information may be directly applied to the new electronic appliance 222. If the information is related to a power consumption amount of the old electronic appliance, the new electronic appliance 222 may take over the information regarding the exiting power consumption amount and produce accumulated information regarding the power consumption amount after replacement. Since an address book or a telephone number book used in the old electronic appliance may be directly used in the new electronic appliance 222, such information may be used after the information is received from the server 202. That is, when there is replacement of the new electronic appliance 222, the information of the old electronic appliance may be directly inherited so that continuity of the electronic appliance may be guaranteed.

In the above-described operations 722-736, the identifier of the electronic appliance 222, i.e., the product identifier or the integrated identifier, may be in the form of further including identification data corresponding to information set to an electronic appliance by a user of the electronic appliance. This is to further distinguish particular information regarding the electronic appliance from other information. That is, when the identifier of the electronic appliance 222 further includes identification data corresponding to particular information, the identifier which further includes the identification data may be identified to be particular information set to an electronic appliance by a user of the electronic appliance 222.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

As described above, according to the present invention, since an electronic appliance identifier for guaranteeing inheritance of information between an old electronic appliance and a new electronic appliance may be generated and information may be managed using the electronic appliance identifier, even when an electronic appliance is replaced, information related to the old electronic appliance may be used without a separate maintenance and repair operation regarding the properties or operation of the electronic appliance. Accordingly, even when an electronic appliance is replaced, information regarding the old electronic appliance may be inherited by the new electronic appliance so that the method may be widely used in various communication network-based technical fields.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of acquiring information of a previous network-connected electronic appliance from a server for utilization of the information in a new network-connected electronic appliance that replaces the previous network-connected electronic appliance, by using an appliance manager that is a device having a network interface and at least one hardware processor and is connected to the new network-connected electronic appliance through a computer network, the method comprising:

receiving, by the network interface of the appliance manager, from the new network-connected electronic appliance that replaces the previous network-connected electronic appliance, information indicating a product type of the new network-connected electronic appliance, data identification corresponding to particular information, and information regarding an entity to which the new network-connected electronic appliance belongs;

generating an integrated identifier of the new network-connected electronic appliance that enables inheritance of information between the previous network-connected electronic appliance and the new network-connected electronic appliance, wherein the generating of the integrated identifier of the new network-connected electronic appliance comprises:

generating, by the at least one hardware processor of the appliance manager, a product identifier of the new network-connected electronic appliance based on the information indicating the product type of the new network-connected electronic appliance, an index corresponding to the previous network-connected electronic appliance, and the data identification corresponding to particular information, the product identifier of the new network-connected electronic appliance including the index corresponding to the previous network-connected electronic appliance and the data identification corresponding to particular information;

generating, by the at least one hardware processor, an individual identifier of the new network-connected electronic appliance from the information regarding the entity to which the new network-connected electronic appliance belongs, the individual identifier indicating the entity; and generating, by the at least one hardware processor, the integrated identifier of the new network-connected electronic appliance by combining the product identifier of the new network-connected electronic appliance and the individual identifier of the new network-connected electronic appliance, so that the integrated identifier of the new network-connected electronic appliance is equal to an integrated identifier of the previous network-connected electronic appliance;

transmitting, by the network interface, the generated integrated identifier of the new network-connected electronic appliance to the server, the server being external to the appliance manager, having a database in which information of a plurality of electronic appliances are stored according to a plurality of integrated identifiers respectively corresponding to the plurality of electronic appliances, and configured to extract the information of the previous network-connected electronic appliance from the database by using the integrated identifier to identify the information;

receiving, by the network interface, from the server, the extracted information of the previous network-connected electronic appliance together with the integrated identifier; and transmitting, by the network interface, the received information of the previous network-connected electronic appliance to the new network-connected electronic appliance, wherein when the data identification is a setting identification, the transmitted information is information for setting the previous network-connected electronic appliance, when the data identification is a usage identification, the transmitted information is information regarding use of the previous network-connected electronic appliances including at least one of power consumption and time usage of the previous network connected electronic appliance, and when the data identification is a user data identification, the transmitted information is information for using the previous new network-connected electronic appliance.

2. The method of claim 1,
wherein, if a plurality of network-connected electronic appliances including the new network-connected electronic appliance transmit information indicating a product type and information regarding an entity respectively, the generating of the product identifier comprises generating a product identifier of each network-connected electronic appliance by adding an index corresponding to each network-connected electronic appliance to an identifier corresponding to the same product type.

3. The method of claim 2, wherein the generating of the product identifier further comprises:
checking whether a product identifier of each of a plurality of network-connected electronic appliances belonging to the same entity as the network-connected electronic appliance comprises the identifier corresponding to the product type of the new network-connected electronic appliance; and
determining an index corresponding to the new network-connected electronic appliance according to a predetermined rule based on a result of the checking.

4. The method of claim 3, wherein, in the determining of the index, when the result of the checking indicates that the product identifier of each of a plurality of network-connected electronic appliance does not comprise the identifier corresponding to the product type of the new network-connected electronic appliance, an index is not added to the identifier corresponding to the product type of the new network-connected electronic appliance or an index corresponding to the start of indexes sequentially arranged according to the predetermined rule is added to the identifier corresponding to the product type of the new network-connected electronic appliance.

5. The method of claim 3, wherein the determining of the index comprises:
checking whether any one of the network-connected electronic appliances among the plurality of network-connected electronic appliances belonging to the same entity as the new network-connected electronic appliance has converted to not belonging to the same entity; and
determining the index of the network-connected electronic appliance that is changed to not belonging to the entity as the index of the new network-connected electronic appliance that newly belongs to the entity.

6. The method of claim 5, wherein, in the determining of the index, when the result of the checking indicates that there is no network-connected electronic appliance among the plurality of network-connected electronic appliances converted to not belonging to the entity, an index corresponding to the next one of a final index is determined to be the index of the new network-connected electronic appliance when sequentially arranging indexes of the network-connected electronic appliances belonging to the same entity as the new network-connected electronic appliance according to the predetermined rule.

7. The method of claim 1, wherein the information regarding the entity comprises information identifying a gateway of the network where the new network-connected electronic appliance is located.

8. The method of claim 1, wherein the information regarding the entity comprises information identifying a user of the new network-connected electronic appliance.

9. A method of providing information, of a new network-connected electronic appliance that replaces a previous network-connected electronic appliance, to a server that provides a service requiring identification of a plurality of network-connected electronic appliances by using an integrated identifier, the method comprising:

receiving, by a network interface of an appliance manager over a network, from the new network-connected electronic appliance that replaces the previous network-connected electronic appliance, a product identifier corresponding to information indicating a product type of the new network-connected electronic appliance, data identification corresponding to particular information, and the information of the new network-connected electronic appliance, the product identifier including an index corresponding to the previous network-connected electronic appliance and the data identification corresponding to particular information;

converting, by at least one processor of the appliance manager, the product identifier into the integrated identifier by adding an individual identifier corresponding to information of an entity to which the new network-connected electronic appliance belongs to the received product identifier; and transmitting, by the network interface of the appliance manager, the integrated identifier and the received information to the server, wherein the server is external to the appliance manager, has a database in which information of a plurality of electronic appliances are stored according to a plurality of integrated identifiers respectively corresponding to the plurality of electronic appliances, and is configured to extract the information of the previous network-connected electronic appliance from the database by using the integrated identifier to identify the information, and the integrated identifier of the new network-connected electronic appliance is equal to an integrated identifier of the previous network-connected electronic appliance, wherein when the data identification is a setting identification, the transmitted information is information for setting the previous network-connected electronic appliance, when the data identification is a usage identification, the transmitted information is information regarding use of the previous network-connected electronic appliances including at least one of power consumption and time usage of the previous network connected electronic appliance, and when the data identification is a user data identification, the transmitted information is information for using the previous new network-connected electronic appliance.

10. The method of claim 9, further comprising:

receiving the integrated identifier of the new network-connected electronic appliance from the server as a response indicating that the transmission is completed;

converting the integrated identifier of the new network-connected electronic appliance into the product identifier by removing the individual identifier from the received integrated identifier; and transmitting the product identifier to the new network-connected electronic appliance.

11. A method of relaying information, of a previous network-connected electronic appliance for utilization of the information in a new network-connected electronic appliance that replaces the previous network-connected electronic appliance, acquired from a server that provides a service requiring identification of a plurality of network-connected electronic appliances by using an integrated identifier, the method comprising:

receiving, by a network interface of an appliance manager over a network, from the server, information of the previous network-connected electronic appliance and the integrated identifier generated by combining a product identifier corresponding to information indicating a product type of the new network-connected electronic appliance that replaces the previous network-connected electronic appliance and an individual identifier corresponding to information of an entity to which the new network-connected electronic appliance belongs;

converting, by at least one hardware processor of the appliance manager, the integrated identifier into the product identifier by removing the individual identifier from the received integrated identifier; and transmitting, by the appliance manager, the product identifier and the information of the previous network-connected electronic appliance to the new network-connected electronic appliance, wherein the server is external to the appliance manager, has a database in which information of a plurality of electronic appliances are stored according to a plurality of integrated identifiers respectively corresponding to the plurality of electronic appliances, and is configured to extract the information of the previous network-connected electronic appliance from the database by using the integrated identifier to identify the information, and the product identifier included in the received integrated identifier comprises an index corresponding to the previous network-connected electronic appliance and data identification corresponding to particular information, wherein when the data identification is a setting identification, the transmitted information is information for setting the previous network-connected electronic appliance, when the data identification is a usage identification, the transmitted information is information regarding use of the previous network-connected electronic appliances including at least one of power consumption and time usage of the previous network connected electronic appliance, and when the data identification is a user data identification, the transmitted information is information for using the previous new network-connected electronic appliance.

12. The method of claim 11, further comprising:
before acquiring the information from the server, receiving the product identifier from the new network-connected electronic appliance as a request for acquisition of the information;
converting the product identifier into the integrated identifier of the new network-connected electronic appliance by adding the individual identifier to the received product identifier; and
transmitting the integrated identifier of the new network-connected electronic appliance to the server.

13. A non-transitory computer-readable recording medium having recorded thereon a program for executing the method defined in claim 1.

14. A non-transitory computer-readable recording medium having recorded thereon a program for executing the method defined in claim 9.

15. A non-transitory computer-readable recording medium having recorded thereon a program for executing the method defined in claim 11.

16. The method of claim 1, further comprising:
transmitting, by the network interface, the generated product identifier from the appliance manager to the new network-connected electronic appliance,
wherein the new network-connected electronic appliance having a memory and is configured to store, in the memory, the product identifier upon receiving the product identifier from the appliance manager.

* * * * *